United States Patent [19]

Hanley et al.

[11] 4,118,345

[45] Oct. 3, 1978

[54] RECOVERY OF POLYACETAL RESINS

[75] Inventors: Michael A. Hanley; Lawrence A. Miller, both of Reading; Irvin H. Kinsey, Saegertown, all of Pa.

[73] Assignee: The Polymer Corporation, Reading, Pa.

[21] Appl. No.: 760,319

[22] Filed: Jan. 18, 1977

[51] Int. Cl.² .................. C08J 11/04; C08L 59/02
[52] U.S. Cl. .................. 260/2.3; 260/824 R
[58] Field of Search .............. 260/2.3, 824 R

[56] References Cited

U.S. PATENT DOCUMENTS

| T870,010 | 3/1968 | Ward | 119/28 |
| 3,419,653 | 12/1968 | Briggs et al. | 260/824 R X |
| 3,491,048 | 1/1970 | Sargent | 260/824 R X |

Primary Examiner—Walter C. Danison
Attorney, Agent, or Firm—Richard O. Church

[57] ABSTRACT

Polyacetal scrap materials are reclaimed for further use by intimately mixing a minor percentage of a polysiloxane fluid with the scrap polyacetal materials. By this technique, undue degradation of the polymer and an undesirable loss in elongation are avoided.

5 Claims, No Drawings

RECOVERY OF POLYACETAL RESINS

BACKGROUND OF THE INVENTION

1. Field of the Invention

This invention relates to a process for the reclamation of scrap polyacetal resins. The scrap material is treated in a manner that avoids undesirable loss of certain physical properties so that the reclaimed material may be reused to make acceptable products.

2. Description of the Prior Art

It has long been an economic practice in the plastics industry to reclaim, when feasible, thermoplastic synthetic resinous materials so that they may be reused. Typically, the scrap materials are screened to remove extraneous dirt, ground to a convenient size, and melt-mixed in an extruder. The extrudate is granulated to form a useful feed for an extruder, injection molding machine, or other plastic thermoforming device.

Sometimes the physical properties of the polymers are adversely affected when they are reprocessed, but there are many applications in which reprocessed polymers will serve quite adequately. When the physical properties of the reprocessed polymers fail somewhat to meet minimum standards for a given application, it is a known technique to blend the reprocessed polymers with virgin polymer. In many instances, the contribution of the virgin material will bring the physical properties of the mixture up to meet the required specifications.

In the case of polyacetal polymers, which are the subject matter of this invention, one of the important physical specifications to meet is that of an elongation at break of at least 30%, as defined in Federal Specification No. L-P-392A. It has been found that when polyacetals are reclaimed as outlined above, this specified elongation cannot be achieved. Still further, this desideratum still cannot be achieved even when as much as 60% virgin polymer is mixed with the reclaimed scrap material.

SUMMARY OF THE INVENTION

Accordingly, it is an object of this invention to provide methods and means for the reclamation of scrap polyacetal material.

Another object of this invention is to provide methods and means for reclaiming polyacetal resins to provide a product that has at least 30% elongation at break.

In accordance with this invention, it has been found that if a minor percentage (i.e., less than 10%) of a polysiloxane fluid is intimately mixed and uniformly dispersed in scrap polyacetal resins, the resins may be reclaimed and reprocessed into useful products having elongations of at least 30%.

The preferred polysiloxane fluid is one that is described by the manufacturer as a dimethyl siloxane polymer having a viscosity of about 30,000 centistokes and may be obtained from Dow Corning under the trade designation "DC 200 Fluid". Effective results have been obtained if as little as 1% by weight of the siloxane fluid is added to the polyacetal resin, and as much as 10% may be accomodated. However, at percentages of about 10% or more, difficulty is encountered in obtaining the degree of homogeneity in the mixture which is required to obtain a stable product.

In order to obtain this homogeneity and a thorough dispersion of the silicone fluid throughout the resin, a melt-mixing device is used, such as an extruder.

It is generally noted that as the percentage of polysiloxane fluid is increased, the elongation of the polyacetal also will increase. Conversely, the tensile strength decreases with increasing oil content. For this reason, when selecting an appropriate percentage of polysiloxane fluid to add to the polymer, judgment must be exercised in balancing the desired elongation against the minimum tensile strength required to obtain an end product that will meet service requirements. Quite generally, it has been found that the addition of 2% of the polysiloxane fluid will not significantly decrease the tensile strength of the polyacetal and, at the same time, will provide an elongation of 30% or better at break, which meets the requirements of Federal Specification No. L-P-392A for injection molded polyacetals.

While the prior art recognizes that polysiloxane fluids of the type found useful in this invention will increase properties of friction and wear of polymers and increase die life, it has not been recognized that these fluids are effective as an aid in reprocessing scrap polyacetal materials to preserve elongation.

EXAMPLES

In the following Examples, unless otherwise noted, the polyacetal resins were copolymers prepared by the polymerization of formaldehyde with from 0.1 to 15 mol.% of a cyclic ether (believed to be ethylene oxide). These resins are sold by Celanese under its trademark "Celcon".

The scrap materials utilized were shavings, turnings, reject parts and the like, mostly produced by machining parts from polyacetal stock shapes, formed by continuous extrusion techniques. The scrap material was coarsely ground to a size in a range of between about ⅛ inch and 3/16 inch in the largest dimension.

A twin-screw extruder (Werner-Pfleiderer) having five axially-aligned barrels was utilized when a silicone fluid was mixed with the scrap material. (A single-screw extruder may also be used.) The silicone fluid was metered into the extruder at barrel #3 by means of a metering, positive displacement gear pump. Barrel #4 was vacuum vented to permit the escape of moisture and products of decomposition. All five barrels of the extruder were maintained at temperatures of 210° C. and the extrusion die and die head were controlled at 205° C. The dye was a multiple-orifice die which extrudes six strands simultaneously in a diameter of about ⅛ inch. A water tank was located immediately following the extrusion die to quench the extrudate. After cooling, the strands were chopped to a length of about ¼ inch in a Cumberland pelletizer and residual water was removed by drying.

The pellets made as above were variously processed in extrusion or injection molding devices, and small specimen bars were prepared from the resulting product to test the physical properties of the reprocessed polyacetal.

The silicone that was utilized is sold under the trade designation "DC 200" by Dow Corning and is described in its literature as being a dimethyl siloxane polymer having a viscosity of about 30,000 centistokes.

EXAMPLE 1

Two virgin polyacetal materials were extruded without the use of silicone fluids, one being of lower viscosity (Celcon M25-01) and one being of higher viscosity (Celcon U10-11). In the first instance, test specimens were prepared from moldings of the granulated extrudate and they had a tensile strength of 8,637 p.s.i. and an elongation at break of 75%. In the second instance, a tensile strength of 8,955 and an elongation at break of 33% was observed.

EXAMPLE 2

In this Example, scrap material comprised essentially of Celcon M25-01 was extruded without the use of a silicone oil and test specimens were prepared from moldings of the granulated extrudate and were found to have a tensile strength of about 8,970 p.s.i. and an elongation of 19%. When the tests were repeated using scrap materials comprised essentially of Celcon U10-11, the tensile strength was 7,686 p.s.i. and the elongation at break was 6%.

EXAMPLE 3

As mentioned in the foregoing description of this invention, first attempts to obtain minimum required elongation (e.g., 30%) were centered around using a mixture of reprocessed and virgin polyacetal. In three separate tests, the ratio, by weight, of the scrap to virgin material was 40:60, 47.5:52.5 and 55:45. In all three cases, the tensile strength approximated 9,000 p.s.i. and, in each case, the elongation at break was 23%. Thus, it was found that the inclusion of up to 60% virgin material did not improve the elongation at break sufficiently to meet the Federal Specification.

EXAMPLE 4

In this series of tests, scrap Celcon U10-11 was mixed with the following weight percentages of DC 200 Fluid and the results are as tabularized:

| % by Weight DC 200 Fluid | Tensile Strength | % Elongation at Break |
|---|---|---|
| 1 | 8,025 | 36 |
| 2 | 7,976 | 56 |
| 5 | 6,956 | 39 |

From this it can be seen that by mixing a small percentage of silicone fluid, preferably about 2%, into scrap polyacetal resin, the resin can be reprocessed to pass Federal Specification No. L-P-392A while still maintaining adequate tensile strength.

We claim:

1. In a method for the recovery of polyacetal scrap material in which extraneous dirt, if any, is removed from the scrap, the scrap is coarsely ground to a size convenient to feed to a screw extruder, the scrap is melted in the extruder, strands are extruded from the extruder, and the strands are chopped to form a molding powder, the improvement comprising melt mixing with the polyacetal scrap material in the extruder between about 1 to about 10 weight percent of a polysiloxane fluid.

2. A method according to claim 1 in which the polysiloxane fluid is added in an amount of about 2 percent by weight of the polyacetal scrap.

3. A method according to claim 1 wherein the polysiloxane fluid has a viscosity of about 30,000 centistokes.

4. A method according to claim 1 wherein the polyacetal resin is a copolymer of a major portion of formaldehyde and a minor portion of a cyclic ether.

5. A polymeric composition prepared in accordance with the method of claim 1 having an elongation at break of at least 30 percent and a tensile strength about 7,000 p.s.i.

* * * * *